United States Patent [19]
Logan et al.

[11] Patent Number: 5,892,536
[45] Date of Patent: Apr. 6, 1999

[54] SYSTEMS AND METHODS FOR COMPUTER ENHANCED BROADCAST MONITORING

[75] Inventors: James D. Logan, Windham, N.H.; Richard Goldhor, Belmont; Daniel Goessling, Wayland, both of Mass.

[73] Assignee: Personal Audio, Methuen, Mass.

[21] Appl. No.: 723,641

[22] Filed: Oct. 3, 1996

[51] Int. Cl.⁶ .................................................. G06F 17/00
[52] U.S. Cl. .................................................. 348/13; 348/7
[58] Field of Search .............................. 395/200.18, 600, 395/200.33, 200.49; 348/571, 13, 7, 10; 455/5.1, 2

[56] References Cited

U.S. PATENT DOCUMENTS

| | | |
|---|---|---|
| Re. 29,051 | 11/1976 | Jones . |
| 3,810,156 | 5/1974 | Goldman . |
| 4,023,456 | 5/1977 | Groeschel . |
| 4,305,131 | 12/1981 | Best ........................................ 364/514 |
| 4,811,325 | 3/1989 | Sharples, Jr. et al. .................... 369/85 |
| 4,918,730 | 4/1990 | Schulze . |
| 4,931,950 | 6/1990 | Isle et al. ................................. 364/514 |
| 5,210,820 | 5/1993 | Kenyon . |
| 5,307,456 | 4/1994 | Mackay .................................... 395/154 |
| 5,319,455 | 6/1994 | Hoarty et al. ............................ 348/571 |
| 5,371,551 | 12/1994 | Logan et al. ............................. 348/571 |
| 5,485,518 | 1/1996 | Hunter et al. . |
| 5,485,611 | 1/1996 | Astle ....................................... 395/600 |
| 5,526,284 | 6/1996 | Mankovitz . |
| 5,541,638 | 7/1996 | Story ........................................ 348/13 |
| 5,557,541 | 9/1996 | Schulhof et al. ......................... 364/514 |
| 5,561,849 | 10/1996 | Mankovitz ................................ 455/45 |
| 5,572,442 | 11/1996 | Schulhof et al. ......................... 364/514 |
| 5,583,937 | 12/1996 | Ulrich et al. .............................. 380/20 |
| 5,592,511 | 1/1997 | Schoen et al. ........................... 375/220 |

*Primary Examiner*—Ellis B. Ramirez
*Attorney, Agent, or Firm*—Testa, Hurwitz, Thibeault, LLP

[57] ABSTRACT

Disclosed herein are systems and methods for editing the content of a broadcast programming signal to provide a proprietary program signal that has been tailored to the preferences of an individual monitoring the broadcast programming signal. Accordingly, the systems and methods of the invention offer computer-integrated television monitoring.

22 Claims, 5 Drawing Sheets

SYSTEMS AND METHODS FOR COMPUTER ENHANCED BROADCAST MONITORING

FIELD OF THE INVENTION

The invention relates to systems and methods for monitoring broadcast programming and, more particularly, to systems and methods that can integrate broadcast programming signals with selected additional programming signals, and that can further edit the integrated signals to provide a user with a proprietary program signal.

BACKGROUND OF THE INVENTION

Today, broadcast programming is recognized as a successful method of mass information delivery. As is generally known, broadcast programming systems typically include both a production facility and a network of transmission facilities. The production facility provides programs, such as television programs and radio programs, and the network of transmission facilities broadcasts the programs to the general population. This process has been remarkably successful at providing information and entertainment to the mass markets.

Unfortunately, the scale and expense of broadcast programming systems dictates that there will be few such systems available to the general public. Accordingly, at any given time, there are only a limited number of programs from which the general public can select. As a consequence, successful programming tends to cater to universal tastes and demands. This leaves unsatisfied the market's demand for programming that is more tailored to the individual audience member. In response to this demand, smaller production companies have come forward to develop and broadcast radio and television programs that are more directed to select segments of the media market. In particular, cable television carriers provide a plethora of programming choices, each of which is tailored to a particular segment of the media market.

Although these alternative broadcasting systems provide a wider selection of information and entertainment programming, they still are directed to relatively large portions of the media market and more troublesome, lack the budgets and talent pools of larger broadcasting systems that enable the larger broadcasting systems to continually provide high quality programming.

Accordingly, it is one object of the invention to provide systems and methods that provide computer-enhanced monitoring of broadcast programming.

It is further object of the invention to provide a system that provides programming that is more tailored to individual audience members.

It is another object of the present invention to provide systems that allow an audience member to selectively control characteristics of a programming sequence being monitored.

It is still a further object of the present invention to provide systems and methods of an audience member to interact with a program sequence being monitored.

Still further objects of the invention will become apparent upon review of the illustrated embodiments and upon reading the following description in conjunction therewith.

SUMMARY OF THE INVENTION

The invention provides systems and methods for editing the content of a broadcast programming signal to provide a proprietary program signal that has been tailored to the preferences of an individual monitoring the broadcast programming signal. Accordingly, the systems and methods of the invention offer computer-integrated television monitoring.

In one aspect, the invention provides apparatus for generating a proprietary program signal that includes a receiver capable of receiving a broadcast programming signal, a buffer, coupled to the receiver and having storage for data signals representative of a portion of the broadcast programming signal, a communication system capable of receiving a marking signal representative of information for modifying the broadcast programming signal, and a processor, coupled to the communications system and the buffer and responsive to the marking signal, for modifying the broadcast programming signal to generate the proprietary program signal.

The term "broadcast programming signal" as used herein will be understood to encompass, but not be limited to, television programs, including satellite television and cable television programs, radio programs, Internet broadcast programs, or any other type of program that is transmitted for reception by an audience.

In one embodiment, systems according to the invention can include a communication system for receiving a data signal that represents computer-readable information, and wherein the processor of the apparatus includes an integrator capable of generating a composite program signal as a function of the broadcast programming signal and the data signal. The integrator can be an electrical circuit card assembly or a software module or any other device capable of combining plural signals. In this embodiment, the sub-carrier system can include an Internet communication system, such as telecommunication interface that includes a modem, that receives video data, audio data, e-mail, or any other type of data capable of being exchanged over the Internet.

In a further embodiment, the processor can include an audio filter for removing audio information from the broadcast programming signal to generate an audio-filtered signal. For example, a system according to the invention can include an audio filter for removing an audio track of a television program to generate an audio-filtered signal that represents the video portion of the television program without the accompanying audio track. In this embodiment, the system can also include an audio generator for generating, responsive to the marking signal, an audio signal representative of a track of audio and for being integrating it with the audio-filtered signal. Accordingly, a system according to this embodiment of the invention can remove the audio track of a television program and replace it with an alternative audio track that can be broadcast from an alternative source and selected by the user for dubbing over the original audio track.

In a farther embodiment, the processor includes a selection controller for providing user selectable edit signals representative of instructions for modifying the broadcast programming signal. In this embodiment, the processor can also include a database memory for storing topic data signals representative of user-preferred topics, and the selection controller generates the edit signals in response thereto. Further, in this embodiment, the database memory can also include a storage device for storing a priority data signal that is representative of a priority level, typically a user selected interest level, associated with the topic data signal stored in the database. Similarly, in this embodiment, the processor can include a segment processor, responsive to the selection controller, for moving segments of the broadcast programming signal into an alternative order.

In a further alternative embodiment of the invention, the system includes a database memory having storage for a segment identification signal that represents a known portion of broadcast programming signal, and a segment filter coupled to the database memory for removing the known portion from the broadcast programming signal. Accordingly, in this embodiment, the system can include a database memory that stores a segment identification signal. The segment identification signal acts as a type of fingerprint for identifying a portion of a broadcast such as the opening credits, an intervening commercial, or other such portion of a broadcast. The segment filter can identify that portion of the broadcast and remove that portion of the broadcast from the broadcast programming signal, thereby editing out that known portion of the broadcast programming signal. In this way, the system includes elements for generating or supplementing a marking signal.

In a further alternative embodiment, the system can include a communication system that has a transmitter for transmitting data signals to a remote site. In this alternative embodiment, an input device can couple to a communication system for receiving input signals typically generated by a user, and for providing the input signals to the communication system for transmission as data signals to the remote site. In this way, a user can enter information, such as user preferences, comments, or other such information, and transmit the entered information to the remote site.

In a further embodiment, the invention provides an apparatus for generating a proprietary program signal comprising a monitor capable of receiving and monitoring a broadcast programming signal, an editing unit for generating, responsive to the broadcast programming signal, a marking signal representative of the information for modifying the broadcast programming signal, and a communication system coupled to the editing unit for transmitting the marking signal to a remote site.

In a still further embodiment, the invention provides an apparatus for generating a proprietary program signal comprising a casting station for generating and transmitting a marking signal. The casting station can have a monitor capable of monitoring a broadcast programming signal, an editing unit for generating as a function of the broadcast signal, a marking signal representative of information for modifying the broadcast programming signal, a communication system coupled to the editing unit for transmitting the marking signal to a remote site, and a receiving station having a receiver capable of receiving said broadcast programming signal, a buffer, coupled to the receiver, and having storage for data signals representative of a portion of the broadcast programming signal, a communication system capable of receiving the marking signal that is representative of instruction for modifying the broadcast programming signal, and a processor coupled to the communication system and the buffer and responsive to the marking signal for modifying the broadcast programming signal to generate the proprietary programming signal.

In another embodiment, the invention provides apparatus for generating a proprietary program signal that includes a receiver capable of receiving a broadcast programming signal, a marking interface for receiving a marking signal representative of information for modifying the broadcast programming signal, a data interface for coupling to a source of computer-readable data being representative of information suitable for monitoring, including viewing or hearing, on a television monitor, and a splicing processor coupled to the marking interface and the data interface, and responsive to the marking signal for generating the proprietary program signal as a function of information representative of the broadcast programming signal and the computer-readable data. An apparatus of this embodiment can further include a local database that couples to the data interface and that has storage for the data signals that are representative of information suitable for monitoring on television monitor, including viewing and hearing. Further, the data interface can couple to a communication system that receives data signals representative of information suitable for monitoring on a television monitor. Further, the apparatus can include a controller for directing the receiver to receive a select broadcast programming signal. For example, the controller can direct a conventional television receiver to select a particular television channel to receive the broadcast programming signal broadcast on the channel. In alternative embodiments, the controller can be a software module that couples to a TV card coupled to a computer system and that provides software control of the channel being received by that TV card. Other embodiments of the controller can be practiced with the present invention without departing from the scope thereof.

The invention can also include a marking interface that has an Internet communication system for receiving marking signals by Internet transmission. Further the marking interface can include a receiver for receiving input signals that are representative of user-generated remote control instructions. This receiver can be responsive to infrared, radio-frequency, keyboard, or any other type of data transmission suitable for allowing a user to provide input to the system.

In one further embodiment, the apparatus can include a signal processor that couples to the marking interface, for processing the broadcast programming signal to detect an occurrence of a pre-defined program segment and for generating the marking signal in response thereto. In one such embodiment, the system can also include an identification signal memory that couples to the signal processor and that has storage for a segment identification signal. The segment identification signal can provide characteristic information of a pre-defined program segment.

DETAILED DESCRIPTION OF THE INVENTION

Figure 1:
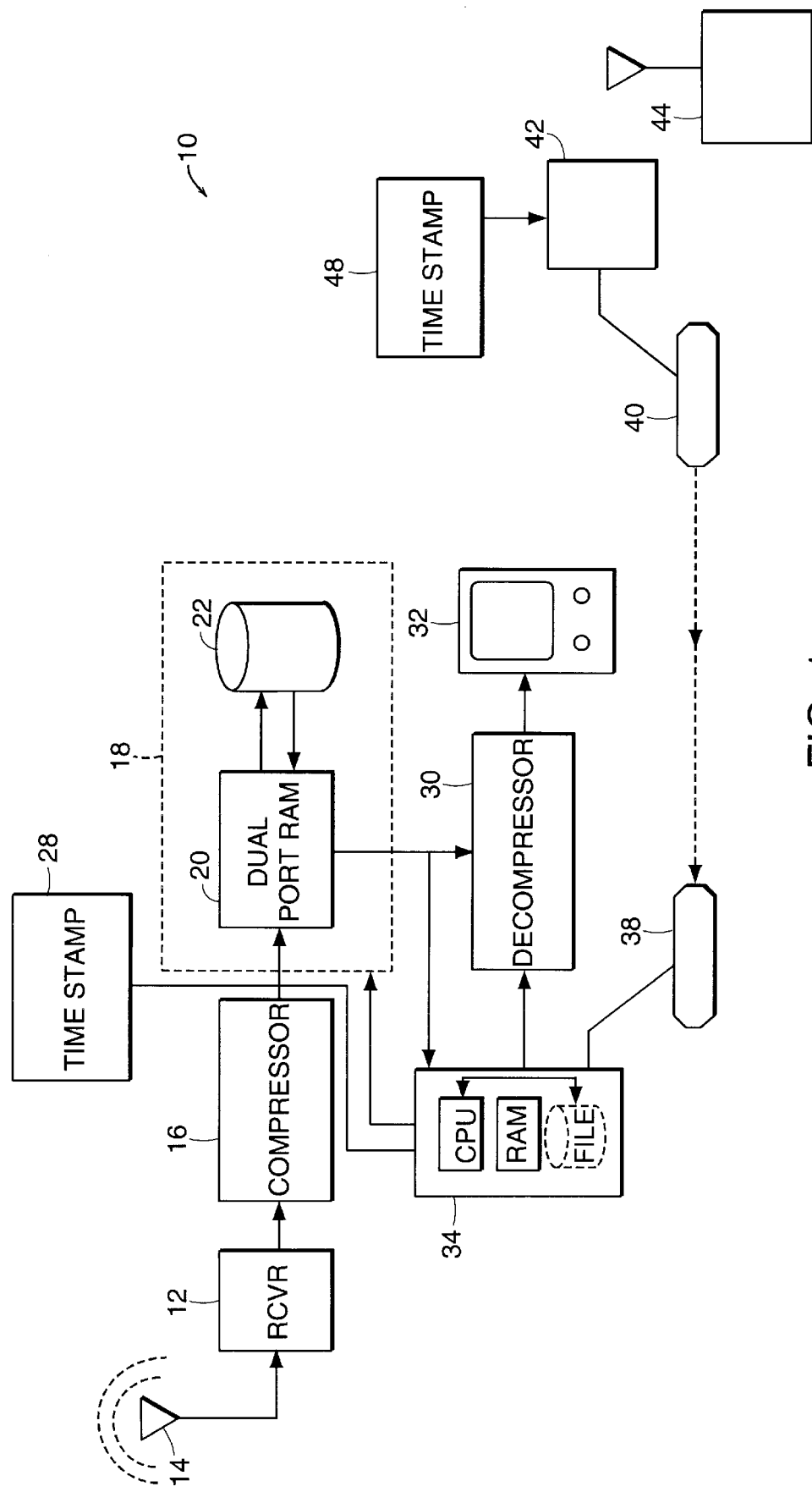
FIG. 1 is a functional block diagram of one embodiment of a system according to the invention.

FIG. 1 depicts a system 10 according to the invention for providing computer-enhanced broadcast monitoring. The system 10 depicted in FIG. 1 is a system for monitoring a video broadcast programming signal, such as a television program, and for editing the monitored program to generate a proprietary program signal having features and information tailored to the preferences of a particular audience member.

Although the system 10 depicted in FIG. 1 depicts a system for modifying a video broadcast programming signal, it will be apparent to one of ordinary skill in the art of communications engineering that alternative embodiments for modifying audio broadcast programming signals, such as radio programs, as well as other broadcast signals, follow from the invention as described herein.

The illustrated system 10 includes a receiver 12, an antenna 14, a compressor 16, a memory system 18, a dual port ram 20, a persistent memory device 22, a time stamp unit 28, a decompressor 30, a video monitor 32, a processor 34, a local communication system 38, a remote communication system 40, an editing unit 42, a remote time stamp 48, and a monitor 44.

The depicted receiver unit 12 couples to the antenna 14 to receive a broadcast programming signal. In one embodiment, the receiver 12 is a conventional television tuner capable of receiving broadcast television signals. In alternative embodiments, the receiver 12 can be a cable receiver, a satellite receiver, a computer network interface, or any other type of receiver capable of receiving a signal. For illustrative convenience, the receiver 14 is shown as a receiver for R-F signals. As depicted in FIG. 1, the receiver 12 couples via a transmission path to the compressor 16. The depicted compressor 16 converts the received programming signal into a compressed digital format suitable for storing in a digital memory system, such as the depicted memory system 18. Optionally, the compressor 16 is an electrical circuit card assembly (CCA) that includes a video encoder/decoder (CODEC) chip set which supports the H.261 video communication standard or the multi-media standards Motion Picture Expert Group (MPEG) and Joint Photographers Expert Group (JPEG). Moreover, the compressor 16 can employ an MPEG compression system for compressing motion video and audio. The design and implementation of the compressor 16 follows from principles well known in the art of computer and video engineering, and which are described in the publication Keith Jack, Video Demystified: A Handbook for the Digital Engineer, (1993).

The depicted memory system 18 acts as a buffer memory for storing a compressed video signal generated by the compressor 16. The depicted memory system 18 has a high-speed random access electronic memory 20 depicted as a dual-port ram, and a slower persistent memory 22 depicted in FIG. 1 as a high capacity magnetic disk drive system. One such memory system 18 is described in U.S. Pat. No. 5,371,551 issued to Logan, et al., the teachings of which are herein incorporated by reference.

FIG. 1 further depicts a time stamp 28. The time stamp 28 can be an electrical circuit card assembly having a clock element thereon that generates at time-spaced intervals a time stamp signal that represents a computer readable periodic time reference. As depicted in FIG. 1, the time stamp 28 is multiplexed onto the transmission path employed by the compressor 16 for providing a compressed program signal to the memory system 18. In a preferred embodiment, the time stamp 28 generates a time stamp at set intervals, such as every five seconds, and the time stamp is multiplexed with the compressed broadcast signal and the multiplexed signal is stored by memory system 18. Accordingly, the time stamp 28 provides a time based index into the compressed programming data stored in the memory system 18.

The depicted decompressor 30 couples via a transmission path to the memory system 18 and can receive the stored compressed programming data. The decompressor 30 can be an electrical circuit card assembly that includes a CODEC chip set that implements the MPEG decoding process for decompressing MPEG motion video into a format suitable for display on a conventional video monitor, such as the video monitor 32 depicted in FIG. 1. The design and implementation of the decompressor 30 follows from principles well known in the art of computer and video engineering, and which are described in Keith Jack, Video Demystified: A Handbook for the Digital Engineer, (1993).

The depicted processor 34 is a digital data processor that can process the compressed programming signal to modify the compressed programming signal, and thereby generate a proprietary program signal which can be stored in the memory system 18. In a preferred embodiment, the processor 34 is a personal computer system, such as an IBM PC compatible personal computer of the type that conventionally includes a central processing unit (CPU), a file storage memory, and a program memory. The depicted processing unit 34 couples via a first transmission path to the input of the memory system 18 and couples via a second transmission path to the output of the memory system 18. As further depicted, the processor 34 can provide a control signal via a third transmission path to the memory system 18 for controlling memory accesses to the memory system 18. The processor 34 can further connect to the decompressing unit 30 and to a communication system 38.

The communication system 38 can be any communication system suitable for receiving computer readable data from a remote site. In one embodiment, the communication system 38 includes a telecommunication system, such as a modem, that connects via the public switching telephone network (PSTN) to a remote site. In one such embodiment, the communication system 38 is an Internet compliant data link that operates under the control of a computer process running on the processor 34 to connect the processor 34 to the Internet computer network. Such communication systems are well known, and any such system can be employed by the invention without departing from the scope thereof.

FIG. 1 further depicts a remote communication system 40, that can be any communication system suitable for transferring data to a remote location, and that can be similar to the communication system 38. The communication system 40 connects via a transmission path to the editing station 42 that connects via a transmission path to the remote time stamp 48. The depicted monitor 44 can receive the same broadcast programming signal being received by the receiver 12. The editing station 42 can generate, in response to the monitored broadcast programming signal, a marking signal that can provide instructions for modifying the broadcast programming signal.

The depicted monitor 44 can include an RF tuner for receiving the broadcast programming signal, which in this example is a television program. The monitor 44 can further include a video display element that can display to an operator at the editing station 42 the television program being broadcast. In one embodiment, the monitor 44 is a conventional television receiver set that includes an RF tuner capable of receiving broadcast television programming signals, and a monitor element capable of displaying the television program being broadcast.

The editing station 42 depicted in FIG. 1 can be an IBM PC compatible computer workstation that executes a computer program that configures the workstation into the depicted editing station 42. In one embodiment, the editing station 42 can provide to the operator an input device. The operator employs the input device to create a marking signal that represents instructions for editing the compressed programming signal stored in the memory system 18. For example, an operator can generate a marking signal that represents an instruction to delete a portion of the broadcast programming signal stored in the memory system 18. In one embodiment, the operator enters a sequence that denotes the beginning of the portion of the compressed broadcast programming signal to be deleted. The editing station detects the input sequence and reads a time signal from the time stamp 48 and stores in the editing station memory a time signal representative of the start-time of the portion of the programming signal to be deleted. At a subsequent time, the operator enters a stop sequence that is detected by the editing station 42. Similarly, the editing station 42 reads the time stamp generated by the time stamp 48 and stores a stop signal in the editing station memory. The editing station 42 then generates, as a function of the start signal and stop signal, a marking signal that represents as a function of the time stamps, that portion of the broadcast programming signal that is to be deleted. The editing station 42 can transmit via the communication system 40 the marking signal to the communication signal 38. The processor 34 can receive from the communication system 38 the marking signal. The processor 34 can determine the start time of the portion of the broadcast programming signal to be deleted and can operate the memory system 18 to search for a time stamp proximate to the time stamp of the start time represented in the marking signal. The processor 34 can then delete that portion of the stored compressed programming signal that is associated with time stamps having values between the start and stop times of the marking signal.

Accordingly, an operator at the editing station 42 can monitor the video programming signal and enter an input sequence at select times, such as at the beginning and at the end of a sequence of commercials, and the editing unit 42 detects the input sequence and collects from the time stamp 48 the time stamps that indicate the beginning and the end of the commercial sequence. The processor 34 can then employ the time stamp information of the marking signal to edit from the stored compressed programming signal that portion of the stored compressed programming signal that represents the commercial sequence. The marking signal can include the start time of the commercial sequence and the length of time of the commercial sequence. Alternate marking signals can be generated to provide information for deleting the commercial sequence. Accordingly, the system 10 can remove from the captured broadcast programming signal a sequence of commercials that occurs intermittently within the broadcast programming signal.

The marking signal can, therefore, be any signal that provides information supplemental to the broadcast programming signal. The depicted system 10 employs the marking signal to modify the broadcast programming signal to provide a proprietary program signal for the individual viewer. Marking signals can carry information on content, to allow screening of violent scenes, to allow deleting of time-outs in sport shows, or to allow editing of shows to show only highlights.

Figure 2:
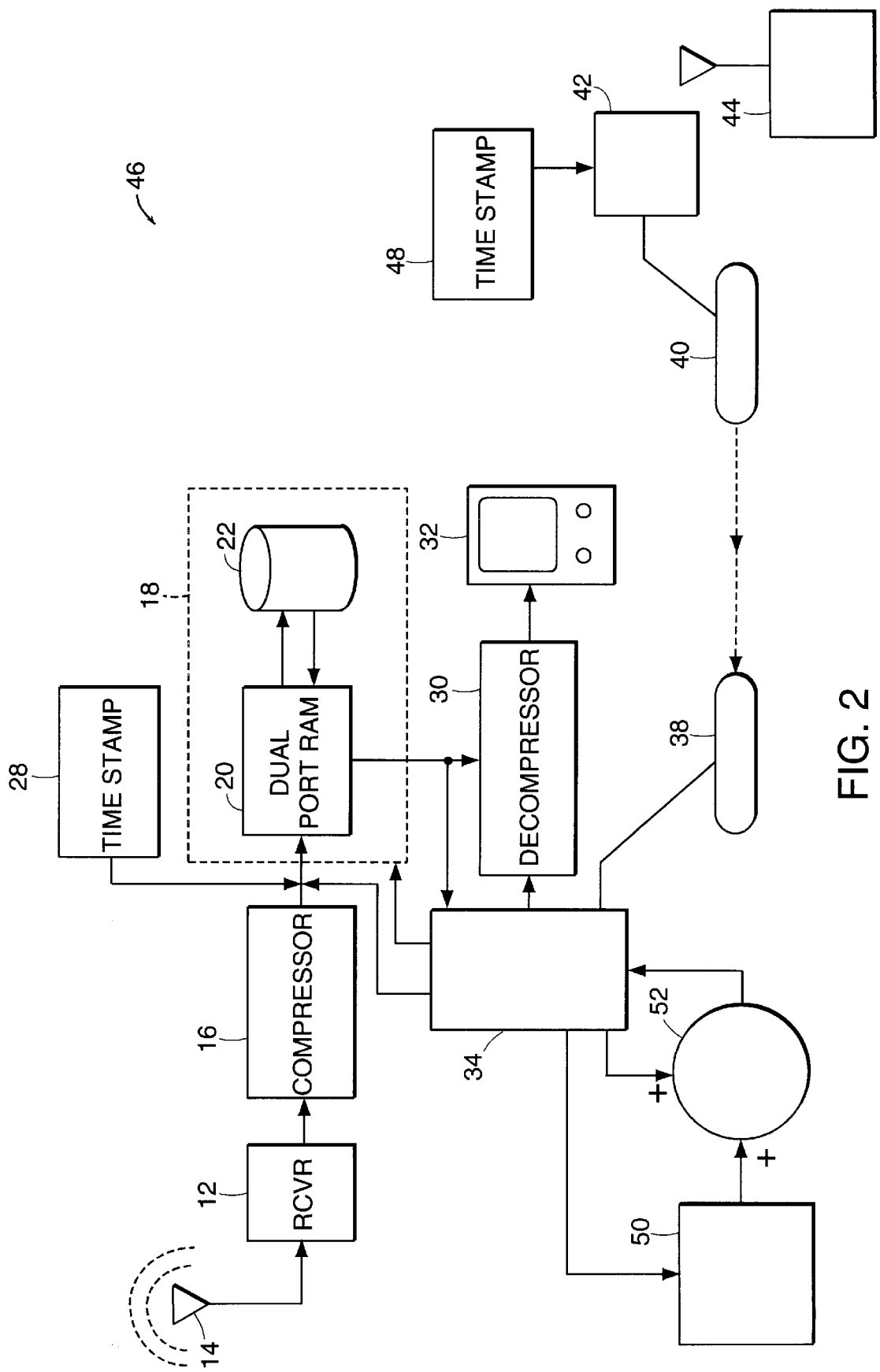
FIG. 2 is a functional block diagram of a further embodiment of the invention having an audio filter for removing an audio track from a broadcast programming signal.

FIG. 2 depicts an alternative embodiment of the present invention that includes a processor 44 that connects via a transmission path to an audio filter 50 and an audio generator 52. In this embodiment, the editing station 42 can generate a marking signal representative of an instruction to remove the audio track of the broadcast programming signal and to dub in an alternative audio track to accompany the video portion of the compressed broadcast programming signal. In this embodiment, the editing station 42 generates a marking signal that includes the instruction to delete the existing audio track and dub in a new audio track. In this embodiment, the editing unit 42 provides the communication system 40 with a data signal that represents computer-readable audio track information, typically a new audio track. The communication system 38 is capable of receiving the marking signal with the data signal and providing the marking signal to the processor 34.

The depicted audio filter 50 can be a digital filter than implements a notch filter for removing the audio sub-carrier, typically set as 4.5 megahertz for the NTSC broadcast standard constructed to well known principles in the art of digital signal processing and which are described in Oppenheim, et al. "Digital Signal Processing", (1975).

The depicted audio generator 52 can be a digital signal integrator device that mixes a new audio signal with the filtered broadcast programming signal to generate a new composite signal having the dubbed in audio track and the original video track. Consequently, a web site can provide a new audio track for sports programs. Further, the web site can display, or link to displays, where sport scores or commentary are available, and the processor can display the web site, responsive to the marking signal, during commercials, or at other intervals. The audio generator 52 can be an electrical circuit card assembly or can be a computer software module executing on the processor 34 and constructed according to well known principles in the art of digital signal processing. It will be apparent to one of ordinary skill in the art of electrical and computer engineering that alternative systems and processes for over dubbing the audio track of a broadcast programming signal can be practiced with the invention without departing from the scope thereof.

Accordingly, the systems, and methods of the invention provide composite programming signals. These composite programming signals can include audio tracks delivered over the Internet. Similarly, the image of the web site that provides the audio track can also be provided to the processor and displayed during commercials or other program segments, in response to the marking signal. Further, the marking signal can instruct the processor to show, during commercials or other segments, other users or sites, or to show data such as sport scores, a television guide, stock prices, news reports, or selected advertisements. The data to be mixed with the broadcast programming signal can be collected by agent software modules during broadcasts of the show. The agent software modules can search sources of data, including the Internet, to find computer-readable data suitable for display on the monitor. Optionally, these agents can operate responsive to user-preferences to collect information of interest to the individual viewers. Additionally, the marking signal can instruct the processor to modify the broadcast programming signal to include a banner, or a window, that displays stock prices, sport scores, e-mail, or other such information along with the broadcast signal.

Figure 3:
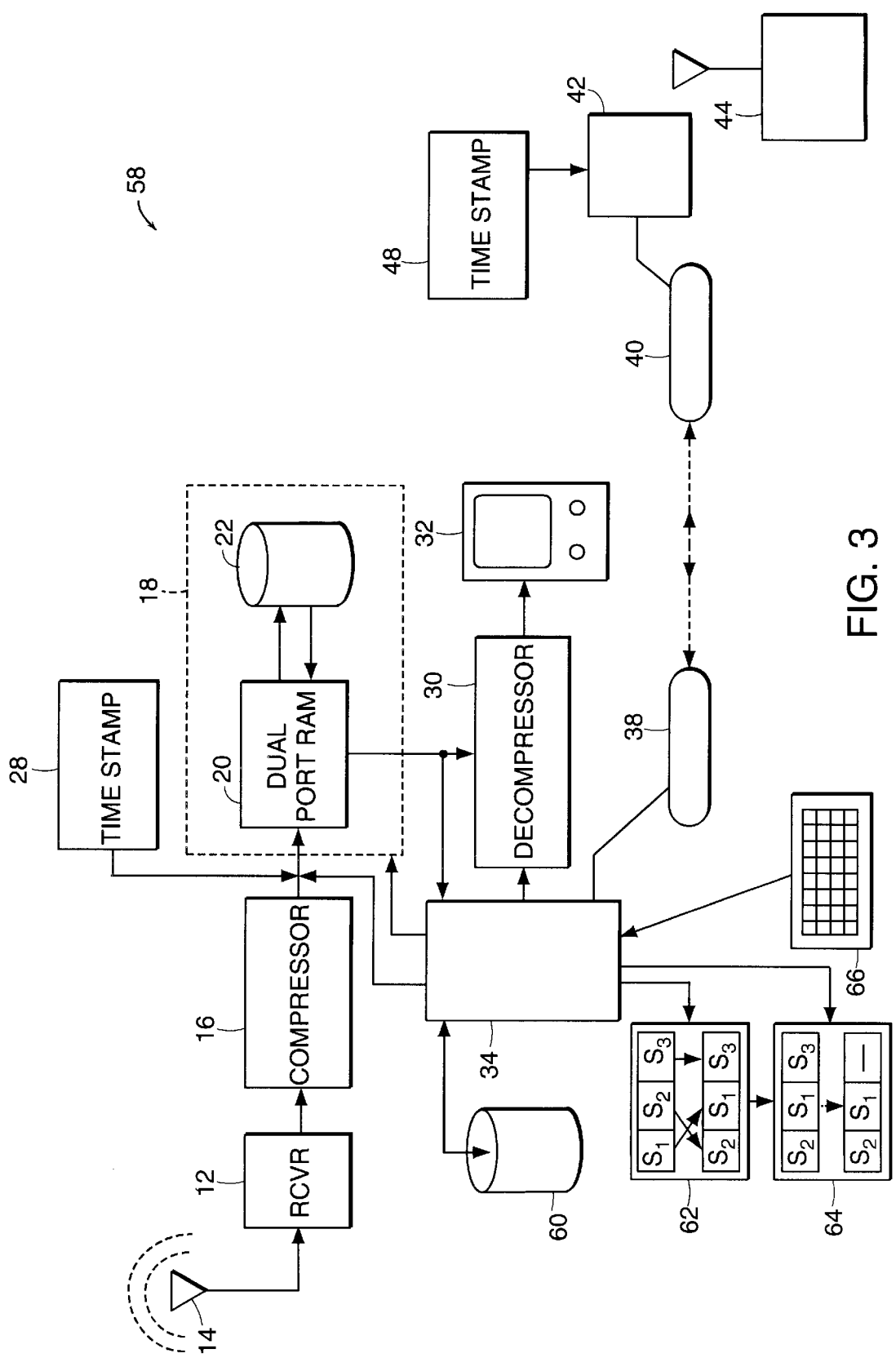
FIG. 3 is a functional block diagram depicting a system according to the invention that includes a segment filter for removing portions of a broadcast programming signal and that further includes an input device and a bi-directional communication system for communicating input data to a remote site.

FIG. 3 depicts a further alternative embodiment of the present invention that includes a processor 34 that connects via a transmission path to a database memory 60, and that connects via a transmission path to a segment processor 62 which connects via a transmission path to a segment filter 64 which connects back to the processor 34. FIG. 3 further depicts a keyboard input device 66 that connects to the processor 34.

The database memory 60 depicted in FIG. 3 can be a computer hard disk memory of the type commonly used for providing persistent storage of computer readable data. The database memory 60 can provide the processor 34 with a storage medium for storing data signals employed by the processor 34 when editing the contents of the memory system 18. In one embodiment, the database memory 60 stores topic data signals, each of which are representative of a user preferred topic. For example, the topic signals can represent keywords of interest, including the names of sport teams, news topics, company names, and other such topic information. In this embodiment, the processor 34 can have a selection controller process module that can be a software module that provides the processor 34 with a user selectable edit signal representative of data for modifying the broadcast programming signal stored in the memory system 18. For example, the database memory 60 can store user selected topic data signals that represent user preferred topics. In this embodiment, the edit station 42 can generate a marking signal that provides topic codes and priority codes for segments of the broadcast programming signal. The processor 34 can retrieve from database memory 60 topic data signals and priority data signals that have been entered by a system user though keyboard 66 to denote topics of importance and the relative priority levels of the denoted topics.

The processor 34 can activate the selection controller to compare the topic data signals stored in database 60 with the topic codes provided by the marking signal, and thereby identify segments of the broadcast programming signal that contain information on topics selected by the user. Furthermore, the selection processor can employ the priority data signal to rank the segments of the broadcast programming signal into an order that follows the priority levels selected by the system user.

In the embodiment of FIG. 3, the processor 34 connects via a transmission path to the depicted segment processor 62 The depicted segment processor 62 can be a circuit card assembly or a software module that operates responsive to instructions from the processor 34 to reorder the segments of the stored broadcast programming signal. Accordingly, the processor 34 can employ the segment processor 62 to reorder the sequence of the segments of the broadcast programming signal to put the segments in an order that is a function of the topic data signals and priority data signals entered by the users. Accordingly, the processor 34 can employ the segment processor 62 to reorder segments of the stored broadcast programming signal so that topics of high priority to the user are reordered to be presented to the user early in the program, and topics of less interest or topics not selected by the user are placed toward the end of the program signal.

As further depicted in FIG. 3, the processor 34 can connect via a transmission path to the segment filter 64. The processor 34 can instruct the segment processor 62 to pass the reordered segments of the broadcast programming signal to the segment filter 64. The processor 34 can also instruct the segment filter 64 to delete certain segments of the stored broadcast programming signal. In one embodiment, the segment filter couples to a database of segment identification signals each being representative of known segments that can occur in a broadcast programming signal, such as a commercial, opening credits, or other such segment. The segment filter 64 compares characteristics of the segments to the segment identification signals to identity a known segment and delete it or edit it accordingly. One such system for identifying known segments of a broadcast program is described in U.S. Pat. No. 4,843,562 issued to Kenyon et al.

The reordered and edited broadcast programming signal can be transmitted to the processor 34 and sent to the decompressor unit 30 for display on the video monitor 32.

Figure 4:
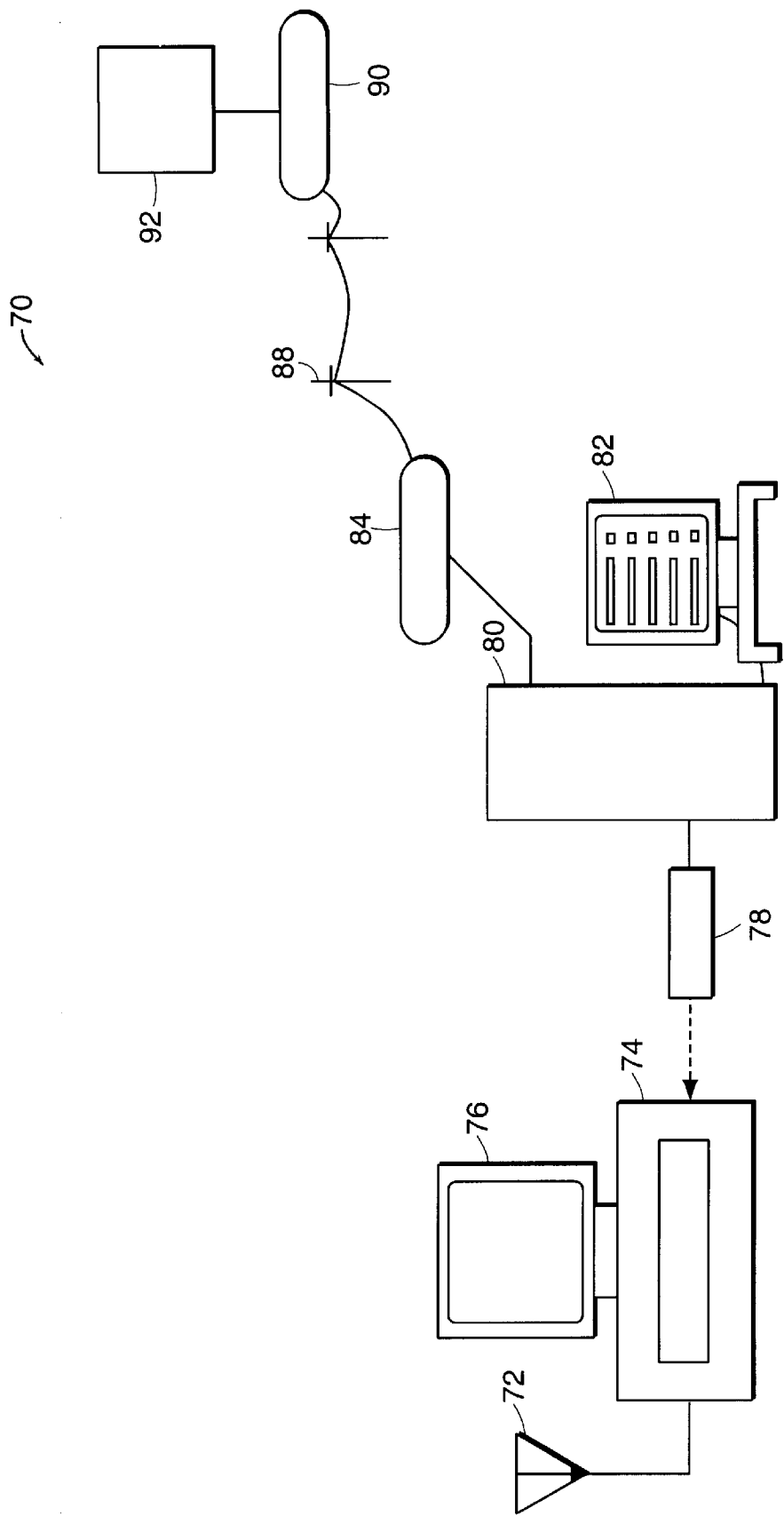
FIG. 4 is a functional block diagram of a further alternative embodiment of the invention that includes a recorder element for buffering a broadcast programming signal.

FIG. 4 depicts a further alternative embodiment of the invention. More specifically, FIG. 4 depicts an antenna 72 for receiving a broadcast programming signal, a receiver and recording system 74 for receiving and recording a broadcast programming signal, a video monitor 76, a remote control 78, a processor 80, a processor monitor 82, a communication system 84, PSTN 88, remote communication system 90, and an editing station 92.

The depicted antenna 72, receiver and recording unit 74, and monitor 76 can be a conventional VCR unit connected to a television set. The VCR unit can act as a receiver and a buffer unit that stores on a conventional VCR recording tape signal representative of the broadcast programming signal being monitored. The VCR unit 74 includes a remote control receiver unit that responds to a remote control signals to control the reception and recording of broadcast programming signals. Preferably, the VCR unit 74 has a remote control unit that follows the Universal Programming Control Standard for remote control units.

FIG. 4 further depicts a processor 80 with a monitor 82 and a remote control unit 78 that couples via a transmission path to the processor 80. In a depicted embodiment, the processor 80 can be an IBM PC compatible computer system operating an application program that configures the processor to operate as the processor depicted in FIG. 4. More particularly, processor 80 can have an application program that provides an Internet connection to a remote Web site, such as the editing station 92, that can provide a marking signal that provides instruction for modifying the broadcast programming signal being stored by the VCR unit 74.

In one embodiment, the processor 80 receives from the remote Web site editing station 92 a marking signal that represents instructions for operating the remote control unit 78. The depicted remote control unit 78 is preferably a remote control unit that follows the Universal Programming Control Standard, and that connects as a peripheral to the processor 80. In one embodiment, the remote control unit 78 connects to the serial port of the PC compatible processor 80. The processor 80 runs an application program that controls the remote control unit 78 to generate infrared remote control signals that selectively operate the VCR unit 74.

For example, as described above, the Web site editing station 92 can transmit a marking signal to the processor 80 that indicates a start time and a stop time for a segment of the broadcast programming signal that is to be deleted. In this embodiment, the editing station 92 can transmit the marking signal in approximately real time to the processor 80. The processor 80 can direct the remote control unit 78 to direct the VCR 74 to stop recording the broadcast programming signal during the segment of the broadcast programming signal that is to be deleted. Similarly, the editing station 92 can generate a marking signal that directs the processor 80 to activate a VCR unit 74 at a select time and for a select channel that corresponds with the start of a selected broadcast programming signal. The editing station 92 can generate a marking signal that can be employed by the processor 80 to operate the remote control 78 to record automatically a selected broadcast programming signal. Accordingly, an operator at processor 80 can select from the Web site certain programs that the operator wishes to record and the Web site 92 can download a marking signal that provides instructions for controlling the recording and editing of the selected broadcast programming signal.

It will be apparent to those of ordinary skill in the art that modifications, additions, and subtractions can be made to the above-described invention without departing from the scope thereof. Similarly, it will be understood that the invention described herein is not to be limited to the embodiments disclosed and described above, but is to be understood by the claims which follow.

Figure 5:
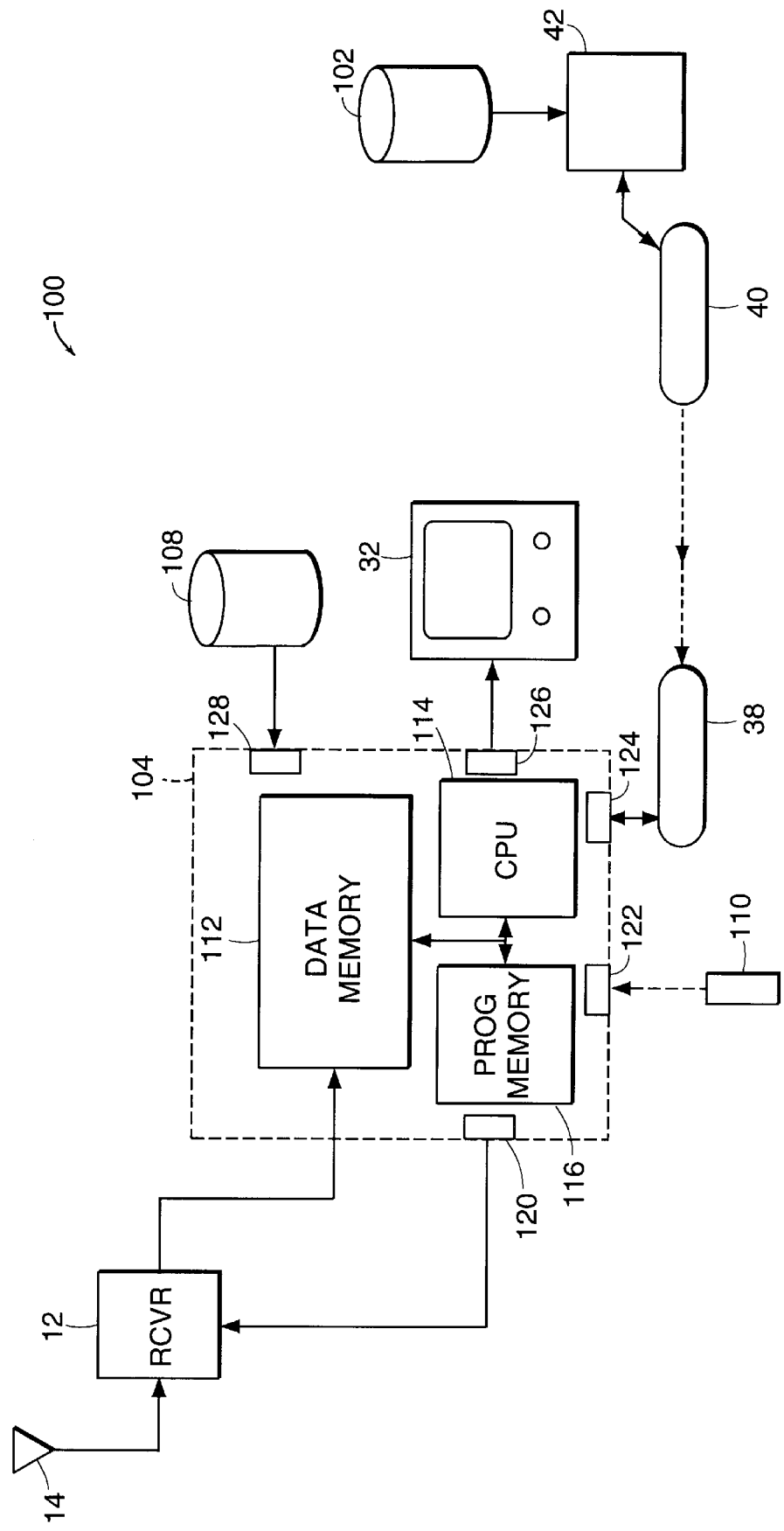
FIG. 5 is a functional block diagram of another alternative embodiment of the invention that allows a user to generate a marking signal.

FIG. 5 depicts a further alternative embodiment of the invention. In particular, FIG. 5 depicts a system 100 that includes a remote database 102 that couples to the editing station 42. FIG. 5 further depicts a local database 108 that couples to the processor 104 that includes a data memory 112, a program memory 116, a CPU 114, a receiver interface 120, a receiver 12, communication interface 124, a monitor interface 126, and database interface 128. The process further includes a data memory 112, a program memory 116, a CPU 114, each of which is interconnected by a bus.

The depicted system 100 can generate a proprietary program signal by operation of the processor 104 that accesses a splicing processor for generating the proprietary program signal from the broadcast signal received by the receiver element 12, and from computer-readable data stored within either of the databases 108 or 102. In one embodiment of the system 100, the receiver 12 receives the broadcast programming signal and stores a copy of this signal in the data memory 112. The data memory 112 can be an electronic memory, such as the RAM memory of a computer system. In this embodiment, the receiver 12 can be a TV card peripheral device that can couple into a slot of the back plane of a personal computer to capture broadcast programming signals and to provide these broadcast programming signals to the video memory of the computer system in order that the video signals be displayed on the monitor of the device. Accordingly, the receiver 12 provides a continuous source of broadcast programming signals to the splicing processor 104.

The splicing processor 104 is depicted in FIG. 5 as a computer system that includes a program that executes on the computer system to direct a computer to splice together broadcast programming signals with other data in response to a marking signal received by that program. In this embodiment, the computer program can be any sequence of executable computer instructions loaded within the program memory 116 of the splicing processor 104. The program can direct the CPU 114 to manipulate the data stored in the data memory 112 and to collect further data from the local database 108 and/or the remote database 102. Accordingly, in one aspect, the invention can be understood as a computer program that operates a conventional computer system to act as a splicing processor that can interface into a receiver for receiving a broadcast programming signal, as well as the marking interface for receiving a marking signal, and to a data interface for coupling to a source of computer-readable data. In this aspect, the computer program directs the CPU 114 to implement a series of editing steps to edit video data stored in the data memory 112. The edited data can represent a composite programming signal that is developed as a proprietary programming signal for display at the monitor 32.

In one embodiment, the system 100 employs the local database 108 to store data signals representative of video and audio information that can be accessed by the splicing processor 104 to edit the video and audio data stored in data memory 112 to provide a composite signal. In one practice, the splicing processor 104 can operate responsive to a marking signal to generate a composite proprietary program signal that removes an indicated program segment, such as a sequence of commercials, and replaces it with a video signal, such as a screen saver image, stored within the local database 108. Further, the splicing processor 104, as described above, can remove the audio track of the broadcast programming signal stored in data memory 112 and replaces is with an alternative audio track, such as background music track, to provide a source of background music during a commercial sequence.

The system 100 can receive the marking signal, from the editing station 42. Alternatively, the system 100 includes a remote control unit 110 and a remote receiver 122 for allowing the user to provide a marking signal to the splicing processor 104. For example, remote control unit 110 can be employed by the user to generate a signal that directs the splicing processor to replace the broadcast programming signal information in the data memory 12 with data from the local database 108. Optionally, the remote control unit 110 can further direct the splicing processor to provide on the monitor 32 an image of a menu for selecting different sources of data that are suitable for being displayed on the monitor 32. Moreover, the remote control unit 110 can operate as a conventional remote control unit 110 for directing the splicing processor 104 to, via receiver interface 120, instruct the receiver 112 to change the channel being monitored and thereby provide an alternate broadcast programming signal. Alternatively, the system 100 can employ a marking signal generating at the editing station 42, as described above, for directing the splicing processor 104 to modify the broadcast programming signal, both by replacing data stored in the data memory 112 with alternate data, as well as by controlling the channel selection by operating the receiver interface 120 to direct the receiver 12 to receive a particular channel.

In the system 100 depicted in FIG. 5, the splicing processor 104 can further include a signal processor that couples to the marking interface for processing a broadcast programming signal to detect an occurrence of pre-defined program segment and for generating a marking signal in response to that detected occurrence. In one embodiment, the signal processor is a video processor that detects changes in scenes, for example, by analyzing the video signals to detect a series of blacked-out images indicating a change of scenes. The splicing processor 104 can employ the detection of a change of scenes as a marking signal for editing the broadcast programming signal. In another embodiment, the signal processor can couple to an identification signal memory that stores a segment identification signal that represents characteristic information of a pre-defined program segment. In one practice of this embodiment, the local database 108 stores a series of identification signals, each of which provides information that acts like a fingerprint for uniquely identifying a known program sequence, such as a commercial. One such system that can monitor an audio track to detect a known program sequence by identifying a known identification signal is described in U.S. Pat. No. 4,843,562 issued to Kenyon et al. The signal processor can employ the occurrence of a detected commercial to generate the marking signal for directing the splicing processor 104 to modify the broadcast programming signal.

It will thus be seen from the above embodiments that the invention provides systems and method for computer-enhanced monitoring of broadcast programming signals. It will be understood that the invention, in one embodiment, provides computer-enhanced monitoring by receiving a marking signal that can be employed by the system for editing a broadcast programming sequence, and that further can include an interface to a source of computer-readable data which is suitable for displaying through a television monitor. Consequently, the systems and methods of the invention provide for editing a broadcast programming signal by deleting sections of that signal, and optionally inserting new segments into the broadcast programming signal, wherein the new segments can be drawn from this source of computer-readable information. It will be obvious to one of ordinary skill in the art that this source of computer-readable can have a varied content. It can include video and audio information. Further, it can provide interactive access by integrating video and text data, such as a web site chat room that can be monitored by the viewer and optionally accessed by the viewer in real time. Moreover, the computer data selected for being integrated with the broadcast programming signal can be selected for each viewer's individual preferences. As described above, agent software modules can be employed by the invention to gather data that is understood as being compatible with the viewer's preferences and for providing this gathered data as a source of computer-readable data that can be stored in a local or remote database for access by the systems according to the invention to provide a source of data for employment when modifying the broadcast programming signal. These and other modifications can be made to the above-illustrated embodiments without departing from the scope thereof.

What is claimed is:

1. Apparatus for generating a proprietary program signal, comprising:
   receiver capable of receiving from a program broadcaster in substantially real time, a broadcast programming signal having a plurality of program characteristics;
   a buffer, coupled to said receiver, and having storage for storing data signals representative of a portion of the received broadcast programming signal;
   a communication system capable of communicating with an editing unit for determining whether at least one of the plurality of program characteristics in the received broadcast programming signal satisfies at least one preselected user-program topic, and receiving a marking signal from the editing unit representative of the existence of the at least one program characteristic in the received broadcast programming signal, satisfying at least one preselected user-program topic; and
   a processor, coupled to said communication system and said buffer, and responsive to said marking signal, for modifying said broadcast programming signal to generate a proprietary program signal comprising the at least one program characteristic satisfying the at least one preselected user-program topic.

2. Apparatus according to claim 1, wherein said communication system includes a sub-carrier system for receiving a data signal representative of computer readable information, and further includes
   an integrator capable of generating a composite program signal as a function of said broadcast programming signal and said data signal.

3. Apparatus according to claim 2, wherein said sub-carrier system includes an Internet communication system.

4. Apparatus according to claim 1, wherein said processor includes an audio filter for removing audio information from said broadcast programming signal to generate an audio-filtered signal.

5. Apparatus according to claim 4, wherein said processor further includes an audio generator for generating, responsive to said marking signal, an audio signal representative of a track of audio for being integrated with audio-filtered signal.

6. Apparatus according to claim 1, wherein said processor includes a selection controller for providing user-selectable edit signals representative of instructions for modifying said broadcast programming signal.

7. Apparatus according to claim 6, wherein said processor further includes a database memory for storing a topic data signal representative of user-preferred topics, and said selection controller generates said edit signals in response thereto.

8. Apparatus according to claim 7, wherein said database memory further includes means for storing a priority data signal representative of a priority level associated with said topic data signal.

9. Apparatus according to claim 6, wherein said processor further includes a segment processor, responsive to said selection controller, for ordering segments of said broadcast programming signal according to a user-selected sequence.

10. Apparatus according to claim 1, further including:
    a database memory having storage for a segment identification signal representative of a known portion of a broadcast programming signal, and
    a segment filter coupled to said database memory, for removing said known portion from said broadcast programming signal.

11. Apparatus according to claim 1, wherein said communication system includes a transmitter for transmitting data signals to a remote site.

12. Apparatus according to claim 11, further including an input device, coupled to said communication system, for receiving input signals and for providing said input signals to said transmitter for transmission to said remote site.

13. Apparatus for generating a proprietary program signal, comprising:
    a receiver interface to a receiver capable of receiving a broadcast programming signal;
    a marking interface coupled with said receiver interface, for receiving a marking signal representative of the existence of a program characteristic satisfying a predetermined user-specified category of personal preferences, said marking signal for modifying said broadcast programming signal; and
    a data interface for coupling to a source of computer-readable data, said computer readable data being representative of information suitable for monitoring on a television monitor; and
    a splicing processor, coupled to said marking interface and said data interface, and responsive to said marking signal for generating said proprietary program signal as a function of the existence of the program characteristic in said broadcast programming signal, and said computer-readable data.

14. Apparatus according to claim 13 further including:
    a local database coupled to said data interface and having storage for said data signals representative of information suitable for monitoring on a television monitor.

15. Apparatus according to claim 13 further including:
    a communication system coupled to said data interface for receiving said data signals representative of information suitable for monitoring on a television monitor.

16. Apparatus according to claim 13 farther including:
    a controller for directing said receiver to receive a select broadcast programming signal.

17. Apparatus according to claim 13 wherein said marking interface includes:

an Internet communication system for receiving said marking signal through an Internet transmission.

18. Apparatus according to claim 13 wherein said marking interface includes a receiver for receiving input signals representative of user generated remote control instructions.

19. Apparatus according to claim 13 further including:

a signal processor, coupled to said marking interface, for processing said broadcast signal to detect an occurrence of a pre-defined program segment and for generating said marking signal in response thereto.

20. Apparatus according to claim 19 further including:

an identification signal memory, coupled to said signal processor, and having storage for a segment identification signal representative of characteristic information of said pre-defined program segment.

21. Apparatus for generating a proprietary program signal, comprising:

a storage module for storing user-determined criteria for modifying a broadcast programming signal;

a receiver in communication with said storage module, capable of receiving from a program broadcaster, in substantially real time, the broadcast programming signal;

an editing unit in communication with said storage module and said receiver, for generating a marking signal when the broadcast programming signal possesses a characteristic satisfying said stored user-determined criteria, said marking signal representative of information for modifying the broadcast programming signal; and a communication system, coupled to said editing unit, for transmitting said marking signal to a user site where a proprietary program signal is generated using said marking signal.

22. Apparatus for generating a proprietary program signal, comprising an editing unit comprising:

a monitor capable of receiving and monitoring a broadcast programming signal;

a memory module for storing information relating to a plurality of subscribers, said information including a plurality of predetermined subscriber-selected topics;

an editing unit in communication with said memory module and said monitor, for comparing said predetermined subscriber-selected topics with said broadcast programming signal as said broadcast programming signal is being received, to determine the existence of a characteristic that relates to at least one of said subscriber-selected topics, and generating said marking signal representative of information for modifying said broadcast programming signal when said at least one characteristic exists; and a first communication system in communication with said editing unit, for transmitting said marking signal; and a subscriber unit in communication with said editing unit, comprising:

a receiver capable of receiving the broadcast programming signal;

a buffer coupled to said receiver, for storing data signals representative of a portion of the broadcast programming signal;

a second communication system capable of receiving said marking signal; and a processor, coupled to said second communication system and said buffer, and responsive to said marking signal, for modifying the broadcast programming signal to generate said proprietary program signal.

* * * * *